(12) United States Patent
Daly

(10) Patent No.: US 7,559,910 B2
(45) Date of Patent: Jul. 14, 2009

(54) TENDON AND LIGAMENT SUPPORT FOR HORSE'S FETLOCK JOINT

(76) Inventor: Andrew Sean Gordon Daly, Marysborough House, Glanmire, County Cork (IE)

(*) Notice: Subject to any disclaimer, the term of this patent is extended or adjusted under 35 U.S.C. 154(b) by 140 days.

(21) Appl. No.: 10/688,988

(22) Filed: Oct. 21, 2003

(65) Prior Publication Data
US 2004/0255955 A1 Dec. 23, 2004

(30) Foreign Application Priority Data
Oct. 30, 2002 (GB) .................... 0225220.3

(51) Int. Cl.
*A61F 5/37* (2006.01)
*A01K 15/04* (2006.01)

(52) U.S. Cl. .............. 602/16; 602/23; 602/27; 119/817

(58) Field of Classification Search ........ 602/5, 602/14, 20, 23, 27–29, 9, 10, 16; 54/82; 119/143, 96, 850, 269; 168/18
See application file for complete search history.

(56) References Cited

U.S. PATENT DOCUMENTS

| | | | | |
|---|---|---|---|---|
| 40,071 A | * | 9/1863 | Wittman ................. | 602/16 |
| 222,290 A | * | 12/1879 | Borendt ................... | 54/82 |
| 901,592 A | * | 10/1908 | Clegg ...................... | 54/82 |
| 1,395,689 A | | 11/1921 | Mckenzie | |
| 2,883,982 A | * | 4/1959 | Rainey .................... | 602/16 |
| 3,209,517 A | | 10/1965 | Hyman | |
| 3,387,305 A | * | 6/1968 | Shafer ..................... | 2/22 |
| 3,439,670 A | * | 4/1969 | Schuerch ................. | 602/26 |
| 3,913,302 A | * | 10/1975 | Centers ................... | 54/65 |
| 4,554,913 A | * | 11/1985 | Womack et al. ......... | 602/16 |
| 4,633,867 A | * | 1/1987 | Kausek et al. ........... | 602/26 |
| 4,726,361 A | * | 2/1988 | Farley ..................... | 602/23 |
| 5,031,607 A | * | 7/1991 | Peters ..................... | 602/27 |
| 5,115,627 A | * | 5/1992 | Scott ....................... | 54/82 |
| 5,167,227 A | | 12/1992 | Meserlian | |
| 5,383,845 A | * | 1/1995 | Nebolon .................. | 602/26 |
| 5,788,618 A | * | 8/1998 | Joutras .................... | 482/114 |
| 5,871,458 A | * | 2/1999 | Detty ....................... | 602/27 |
| 5,897,520 A | * | 4/1999 | Gerig ...................... | 602/27 |
| 6,553,994 B2 | * | 4/2003 | Bard ........................ | 128/845 |

FOREIGN PATENT DOCUMENTS

| | | |
|---|---|---|
| DE | 7764 | 10/1879 |
| DE | 14561 | 7/1881 |

\* cited by examiner

*Primary Examiner*—Danton DeMille
(74) *Attorney, Agent, or Firm*—Young & Thompson

(57) ABSTRACT

A tendon and ligament support for a limb joint, such as an ankle joint, in particular a horse's fetlock joint. A first collar (1) is adapted to embrace the limb above the joint and a second collar (3) is adapted to embrace the limb below the joint. A connection provides articulation between and separation of the two collars, and is adapted to provide limited elongation of the ligaments and/or tendons under load, and includes a resistance-exerting pivot arrangement (11) resisting joint flexion or extension over a predetermined range of joint rotation, and an essentially inelastic part (12) for limiting joint extension across the posterior side of the joint connected to one or more points on each of the collars, and preferably adapted so as to mimic an artificial tendon or ligament arrangement.

10 Claims, 14 Drawing Sheets

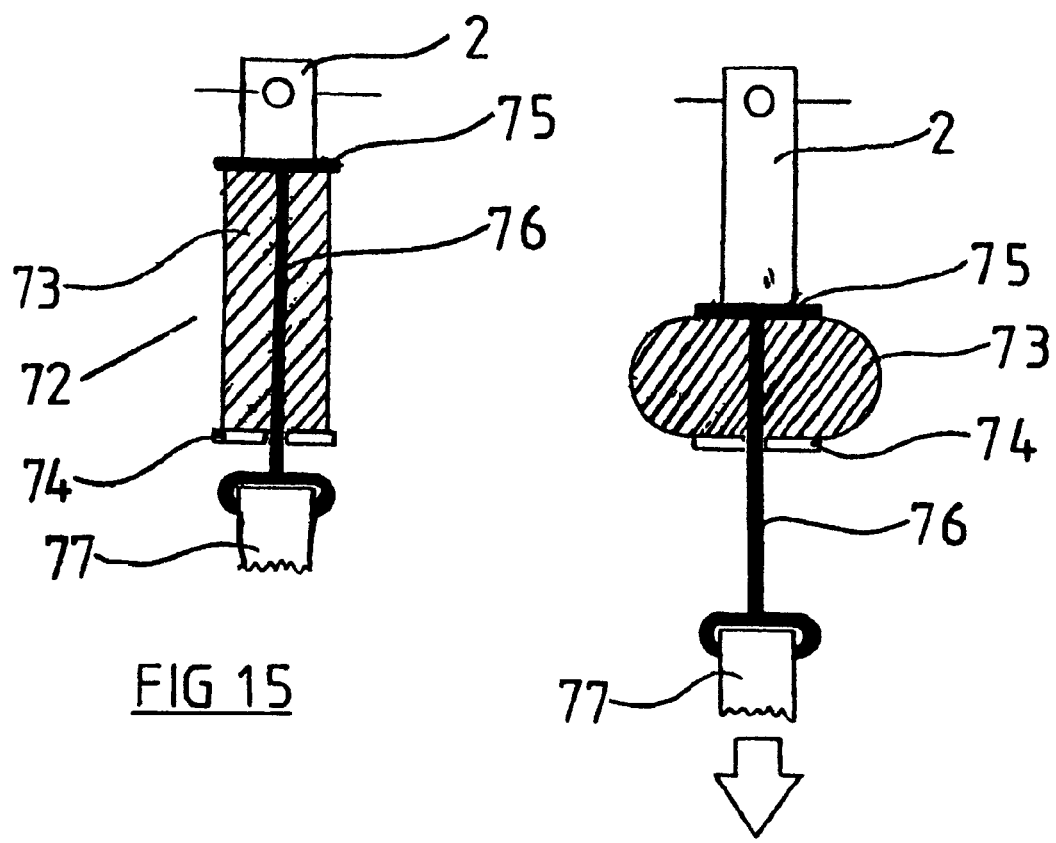

SEC X-X

SEC A-A

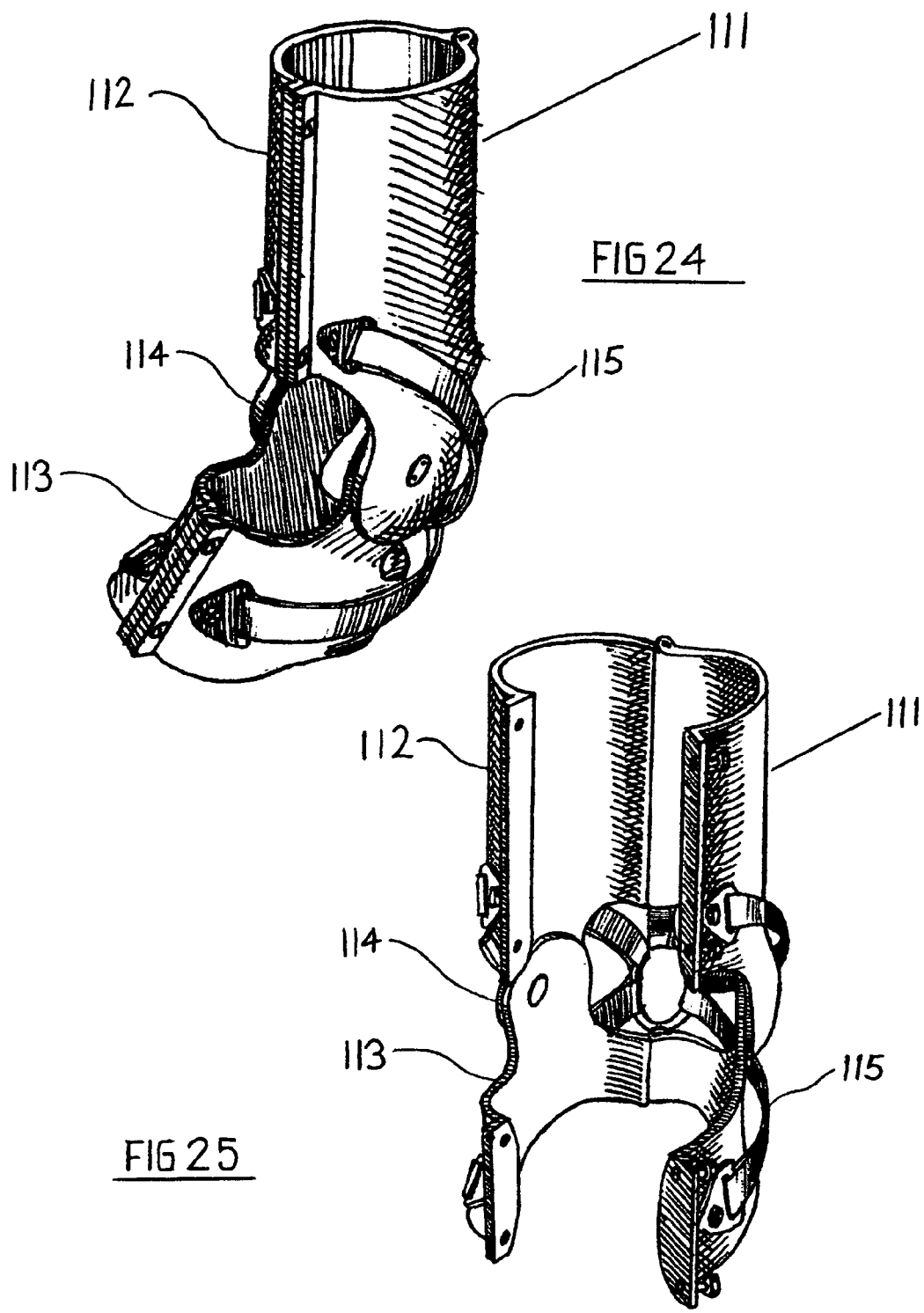

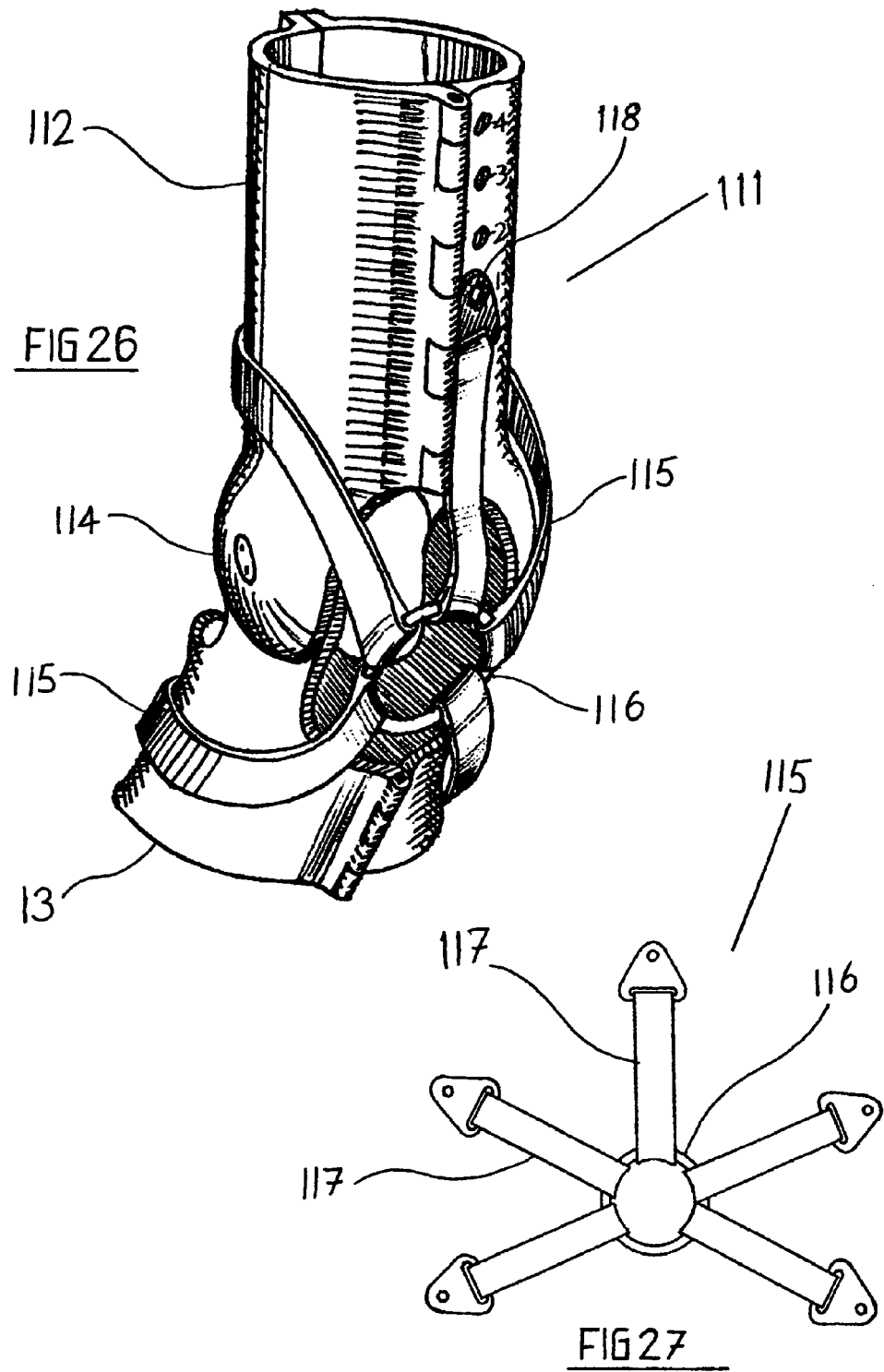

TENDON AND LIGAMENT SUPPORT FOR HORSE'S FETLOCK JOINT

The present invention relates to a protection system that prevents and treats damage to the tendons, ligaments and other structures of a leg which would otherwise be caused by exercise induced strain, exercise induced hypothermia or by external striking. The invention relates in particular to a tendon and ligament support for an animal such as a horse.

BACKGROUND TO THE INVENTION

Tendon and ligament supports are well known in the field of equine medicine. They are used as a support system to prevent tendon and ligament injury and to facilitate the treatment of such tendon and ligament injury. One of the most delicate parts of a horse's anatomy is the area of the canon bone, fetlock joint and pastern regions of the lower leg beneath the knee and hock joints in particular the flexor tendons and suspensory ligaments are subject to strain injury. There are various causes of these injuries, all of which are well known to those engaged in the equine industry. The primary cause of such injury is generally over rotation of the fetlock joint for example, if a horse is excessively tired or unfit then the fetlock joint rotation can cause a dangerous level of tendon strain as it gallops at speed. It has been suggested that when tendon elongation is less than 8% of its relaxed length, there is no danger whatsoever to a horse and where the elongation exceeds 8% and progressively increases to 12% there is increasing stress until there is generally failure when the tendon elongation exceeds 12%. These figures must be taken as illustrative only because, obviously, the amount of tendon elongation will vary from horse to horse and the damage will also vary possibly depending on ambient conditions. However, these figures give some idea as to the approximate range of strain which needs to be considered.

The second major cause of equine tendon and ligament injury is over heating of the tendon material which in turn arises out of the dynamic loading experienced as a horse gallops. Recent research carried out by veterinary science institutions has concluded and published such conclusions which state that the heat generated within the superficial and deep digital flexor tendons and the suspensory and check ligaments of the horses lower leg during exercise is a significant factor in causing the onset of injury to this said anatomy. The studies show that the constant dynamic loading on these tendons and ligaments while the horse gallops causes an accumulation of heat that can reach 45° C. Collagen cells have viability only below a temperature of 42.5° C. Any temperature at or above 42.5° C. will result in irreparable necrotic damage to the collagen cells of which the tendon tissue is comprised. By reducing this build-up of temperature in the tendon and ligament group while exercising, cell necrosis is reduced and consequently the risk of injury to this anatomy can be significantly reduced.

Horse trainers frequently use existing boots and bandages for the purpose of protecting the horses legs against traumatic injuries caused by a strike impact from a hard object, most often a strike impact from another of the horse's legs. However these conventional boots or bandages, because they entirely cover the tendons while exercising, heat insulate the horses tendons and ligaments and prevent the aforementioned exercise induced heat from escaping to the outside air. FIG. 21 illustrates this problem where the heat transmits from the tendon core outward to the leg surface where it is blocked from further dissipation by the insulating effect of the conventional boot or bandage. Heat within the tendon core will then accumulate. Consequently the risk of heat injury to the tendons and ligaments is increased by the use of such heat insulating boots and bandages. The horse in nature is protected somewhat against such exercise induced heat build-up within the tendon and ligament cores, by the fact that as it gallops the cold air, passing unrestricted over the surfaces of the bare leg of the horse, takes with it a proportion of this said heat build up and thereby cools or reduces the core temperature of these tendons and ligaments. By using conventional boots and bandages this natural cooling method is lost.

A third major cause of tendon damage is when the tendons of the front leg are struck by the horse's hind leg. The horse's lower leg below the knee and hock joints, is also subject to a variety of traumatic injuries caused by a strike impact from a hard object, most often a strike impact from another of the horse's legs. These injuries include but are not limited to traumatic injury of the superficial digital flexor tendon, deep digital flexor tendon, the suspensory ligament, the check ligament, the extensor tendons, the skin, the synovial sheaths, the sesamoid bones, the coronet band and to the entire metacarpophalangeal joint area. There are in existence devices that are designed to protect the above-mentioned specific anatomy from a traumatic injury caused by a strike impact from another of the horse's legs. These conventional strike protection devices aim to shield the horse's legs from an impact and are at present constructed from one of the following materials: leather, plastics, rubber, woven fabric and non-rigid Kevlar. However it has been observed by veterinary surgeons that while these devices prevent penetration of the walls of the devices, they are not entirely effective at preventing injury. Indeed serious traumatic injuries to the aforementioned specific anatomy have continued to occur frequently despite the horses in question wearing these conventional devices at the time of injury. FIG. 28 illustrates this very problem which commonly occurs during an accidental overreach while wearing one of the currently available devices. The hind leg can strike into the tendons of the front leg with an impact force in excess of 1000 Kg. It can be seen that the conventional strike prevention devices when struck by the hind leg at such forces, while they will prevent actual penetration of the impacting object through the wall of the device, they do not have sufficient stiffness and hardness to maintain their original shape. Consequently their shape deforms at the point of impact and the force is concentrated and effectively penetrates through to the fragile tendons and ligaments underneath. The result is inevitably a traumatic injury. The sources of impact include not only another of the horse's own legs but also can be from a fence which a horse is jumping, a polo mallet, a polo ball, the terrain or any other possible sources of external impact to which a horse could be exposed.

A further problem that occurs when a horse suffers a leg injury is that there is a high incidence of consequent tendon and ligament injury to the opposite leg as the animal takes the weight off the injured limb and places it all onto the opposite leg. Also, rotation of the fetlock joint can lead to a risk of carpal bone chip fracture.

In this specification the term "rotation" when used in relation to joints means pivoting or movement as would be the normal use of the joint and not as it is sometimes used to mean a twisting or other abnormal distortion of the joint. Thus, the terms "rotation" and "pivoting" are used interchangeably in this specification. Also the terms >"fetlock joint" and "metacarpophalangeal joint" refer to the same joint.

Many methods have been used to prevent or cure these problems and have heretofore been relatively inefficient and of limited or little use. For example, in GB-A-2,166,655 there is described and claimed a shock absorbing fetlock support of this general type, that can be best described as an auxiliary tendon support which is not in fact a full support system, even though it is described as such. It would undoubtedly absorb a certain amount of shock, but does not effectively limit rotation of the fetlock joint and hence tendon and ligament strain, which is an object of the present invention. The problem is that it does not take what is effectively the impact of the horse's hoof and the weight transmitted there through all of which is transmitted through the fetlock. This is because, in nature when the horse gallops, the hoof strikes the ground causing the fetlock joint travels downward towards the ground and while undoubtedly one of the problems is that this downward extension by the fetlock joint is transferred to the tendons and ligaments of the horse. The invention described in GB-A-2,166,655 would undoubtedly assist in protecting the fetlock joint but may not as suggested limit the strain on the tendons.

U.S. Pat. No. 5,579,627 describes a protection wrap for the horse's lower leg. In a laboratory experiment conducted by a major veterinary university in the UK to evaluate various non-rigid support systems for the equine metacarpophalangeal joint, this device was assessed as a means of supporting the metacarpophalangeal joint. It concluded that the device described by U.S. Pat. No. 5,579,627 had no significant effect in reducing tendon and ligament strain in horses. This is due to the fact that the soft materials from which it is constructed do not have sufficient strength and stiffness to cope with the immense forces of 2000-3000 Kg of tensile load on the flexor tendons as a horse exercises, whereas the invention described herein was proven to have a significant effect in reducing tendon and ligament strain in horses. U.S. Pat. Nos. 1,395,689; 3,209,517; 5,115,627; GB-A-1,153,613; GB-A-1,472,436 are representative of the prior art describing a similar form of boot used to protect a horse's foreleg from strikes by a hind leg, for example when galloping, but do not adequately prevent the fetlock and tendons being under constant stress.

GB-A-1,153,613 describes a support device with collars above and below the joint held together by an arrangement including an adjustable connecting strap at the back of the leg, but no hinge arrangement. While this provides a limited amount of support at a standstill, support during exercise is effectively not possible because the two collars will pull together under a tensile load.

U.S. Pat. No. 3,439,670 describes a brace for rigidly supporting knee and fetlock joints in animals. However, movement of a limited kind may be allowed by the provision of a spring-loaded hinge arrangement. The spring projects from brackets to the front of the horse's leg counteracting an articulated or hinted part of the brace to the sides of the horse's leg, to resist extension of the joint. However, this is an awkward arrangement because of the position of the spring to the front of the joint, which obstructs to the flexion of the joint, so that there is very little control of the degree of allowable movement, and no provision for any allowable sideways rotation at the fetlock joint. Also there may be a tendency for the upper part of the brace to slide upwards under load and lose its position, as there is nothing to hold the device in position along the back of the fetlock as the brace straightens out under load Thus a need is identified for a tendon and ligament support that can effectively limit tendon and ligament strain as a horse exercises or rests by limiting the degree of rotation of the fetlock joint to a safe level and of which such support can be adjusted by the user.

Thus a need is identified for a tendon and ligament support applied to the horse's leg that will coot the said tendons and ligaments during exercise.

Thus a need is identified for a tendon and ligament support for the horse's leg that has the stiffness and strength to maintain its shape during the severest of strike impacts. It can therefore distribute the impact forces over a wider area and consequently significantly reduce the possibility of a strike injury. There is also identified a need for a strike impact protection device that can deflect the strike impact away from the horse's leg in the quickest possible time. This immediate deflection will further aid to protect the horse's leg.

SUMMARY OF THE PRESENT INVENTION

The present invention provides a tendon and ligament support device for a limb joint in accordance with claims which follow. The invention is ideally suited to, but not limited to, a load-bearing limb joint such as a knee or ankle joint. Most suitably, the invention is adapted for use as a tendon and ligament support device for an especially a horse's fetlock joint.

In the present invention, a connection means between two articulated limb-embracing collars is adapted to provide limited ligament and/or tendon elongation under load, and includes means arranged to the posterior side of the joint so as to exert a resistance to joint movement over a predetermined range of joint rotation. A unique function of the support of the present invention is that it resists joint extension only while allowing unrestricted flexion of the joint.

This present invention prevents injury to tendons and ligaments in a number of ways. Firstly the invention is directed towards providing such a tendon and ligament support which will have the advantage not alone of supporting the tendons and ligaments, but of effectively replacing the tendons and ligaments as it were and ensuring that all or substantially all of the downward force exerted by body mass, while exercising or standing, is directly transmitted from the flexor tendons and suspensory ligament to the front of the leg bones, for example the canon and pastern bones in an animal such as a horse. Secondly, further injury is alleviated by incorporating a built-in cooling system which effectively cools the tendons during exercise. Thirdly, the present invention aims not merely to stop an impacting object from penetrating through the walls of the device and injuring the tendons and ligaments beneath, but to prevent any of the forces of impact from reaching the said anatomy The present invention is further directed towards providing a tendon and ligament support which can be used not alone for the prevention of tendon and ligament injury but also as an improved treatment of such injury.

In one embodiment of the invention a resistance-exerting pivot means incorporates an adjustment means to vary the amount of resistance to pivoting and therefore the range of fetlock joint rotation over which it exerts the said resistance. The advantage of this is that it allows veterinary surgeons to control the heating of the injured tendons. By means of its quick adjustment control it is possible to reduce gradually the amount of support it provides to the injured tendons as they heal. This will overcome problems associated with tendon repair caused by sudden loading on an injured leg when a cast is removed and on return to exercise. It will also overcome the problem of adhesions of the flexor tendon and suspensory ligament. This is a build-up of scar tissue that often occurs using conventional methods of tendon injury treatment. As a certain amount of mechanical loading is important for healthy healing and prevention of adhesions, this ability of the invention described here to support the limb in a controlled manner has, in clinical cases, enabled animals to be brought back into light work earlier thus reducing the convalescence period In another embodiment of the invention, the pivot means is arranged to prevent pivoting beyond a predetermined critical amount of fetlock joint rotation. The advantage of this is that, when used as an injury prevention method, the device will not interfere with the normal movement of the horse during exercise but will only resist joint rotation if it should reach a dangerous level that would otherwise result in tendon strain.

Ideally, the pivot means is arranged to exert progressively increasing resistance to pivoting as the fetlock joint rotates under downward pressure. The advantage of this is that the more the fetlock joint rotates, the harder it becomes for the horse to rotate the actual joint, preventing any subsequent injury. This is very beneficial when a horse has already injured one leg, thus preventing any further damage to the injured leg and preventing the increase load on the uninjured legs. Here a tendon and ligament support is provided in which the pivot means is arranged to exert increasing resistance to pivoting as the fetlock joint rotates under downward pressure.

In one embodiment of the invention the pivot means is arranged to exert no resistance to pivoting until the fetlock joint rotates beyond a predetermined critical amount of fetlock joint rotation. Again, while preventing injury it does not interfere with the normal movement of the horse.

In a further embodiment of the invention the connection piece accommodates limited lateral movement between canon and pastern bone which has the advantage of allowing the invention to be used on animals with abnormal or crooked joint rotation.

In a still further embodiment of the invention the pivot means is formed by a hinge having its pivot joint concentric with the pivot point of the horse's fetlock join. The advantage of this is that the hinge of the support device moves in exact unison with the horse's own natural movement of the fetlock joint. This will ensure that the support device does not move or slip from its correct position on the horse's leg when in use. It also has the advantage of stopping the canon bone embracing collar and the pastern bone-embracing collar from being forced together under load.

Ideally there is a pair of hinges, one on either side of the fetlock joint. This provides added support to the fetlock joint, reducing the risk of dislocation from the correct position on the leg.

In a further embodiment of the invention the hinge incorporates a brake to provide desired resistance to pivoting. The brake may be adjusted to suit any individual horse's movement, which might not necessarily suit another horse as the load exerted would be individual to each animal, when affected by such factors as weight and speed.

In another embodiment of the invention the hinge incorporates a stop to prevent rotation beyond a predetermined critical amount of fetlock joint rotation. This would be advantageous in that there is no possibility that the horse would ever over-rotate the fetlock joint In yet another embodiment, a means for locking or clamping the hinge is provided enabling the fetlock joint to be totally immobilised in the manner of a cast around the horse's leg. Thus, the tendon and ligament support of the present invention could be used to exert total resistance to joint movement in both flexion and extension when so required, for example during the early stages of injury treatment In a further embodiment of the invention the desired resistance to pivoting is provided by an artificial tensile tendon comprising an extendable connection piece connecting the collars adjacent the back of a horse's leg. The ability to adjust the tension of the artificial tendon is beneficial in circumstances such as when the horse has already sustained a leg injury and its natural desire is to place the entire bodyweight onto the opposite leg. When the support is fitted to both legs, there is no risk of consequent strain injury to the opposite healthy leg.

In a further embodiment of the invention the artificial tensile tendon extends around the leg to embrace the sesamoid bones behind the fetlock joint.

In a still further embodiment of the invention there is a rigid connection between the hinge and the artificial tensile tendon on both sides of the leg to allow limited movement therebetween.

Ideally the connection piece comprises a piece of substantially inelastic material capable of limited flexion to provide pivot means.

Ideally the canon bone-embracing collar incorporates a rigid elongate support extending along the canon bone and the pastern bone-embracing collar incorporates a rigid elongate support extending along the pastern bone. In another embodiment of the invention the pastern bone-embracing collar extends over the hoof.

In a further embodiment of the invention the elongate support is adjacent the front leg.

In a still further embodiment of the invention each collar comprises a front panel with air intakes allowing air or fluid to penetrate through the front of the device. Connecting channels in the walls of the canon bone collar allow the coolant air or fluid that enter through the front to pass from the front of the leg around to the back of the leg where the tendons and ligaments in question are located.

In yet another embodiment of the invention, each collar may further comprise a shock absorbing foam lining, a gas permeable panel covering the tendon area at the back of the leg which allows hot or cold air or fluid to pass. This comprises materials that include but are not restricted to a gridwork of perforated foam or a gas permeable membrane such as a thin fabric. A curved composite material panel of a hard and smooth outer surface, is attached to the back of the foam lining about the position of the horse's flexor tendons and suspensory and check ligaments. A curved composite material panel of a hard and smooth outer surface, is attached externally to the front of the foam lining about the position of the horse's extensor tendons. A curved composite material panel of a hard and smooth outer surface, is attached externally to the foam lining about each side of the horse's fetlock joint.

Preferably a cushioning material is interposed between the inside surface of the collars and the horse's leg.

In another embodiment of the invention the cushioning material is of a viscoelastic foamed plastics material.

In another embodiment of the invention the canon bone embracing collar and the pastern bone-embracing collar are each opening central to the front of the leg.

In another embodiment of the invention the artificial tendon component has a central ring embracing the sesamoid bones. Anchored around the ring is an array of straps, of adjustable tension and length, which are in turn anchored to the canon bone embracing collar and the pastern bone-embracing collar.

In another embodiment of the invention the outer surfaces of the construction comprises a significantly stiffer and harder structure and shape that will retain its original shape under the severest of strike impacts and will distribute the force of this impact over a wider area. Due to its hard and smooth curved shape, it will immediately deflect the force of the impact away from the horse's leg.

DETAILED DESCRIPTION OF THE INVENTION

The invention will be more clearly understood from the following description of some embodiments thereof given by way of example only with reference to the accompanying drawings in which.

Figures 11, 12:
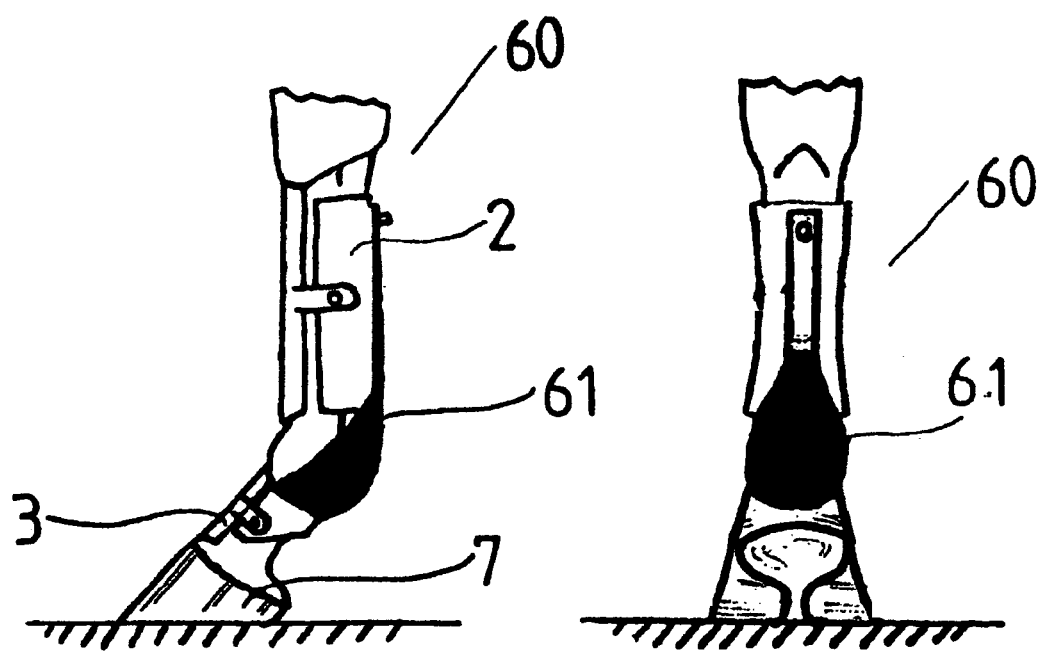
FIG. 11 is a side view of a still further tendon and ligament support according to the invention.
Figures 13, 14:
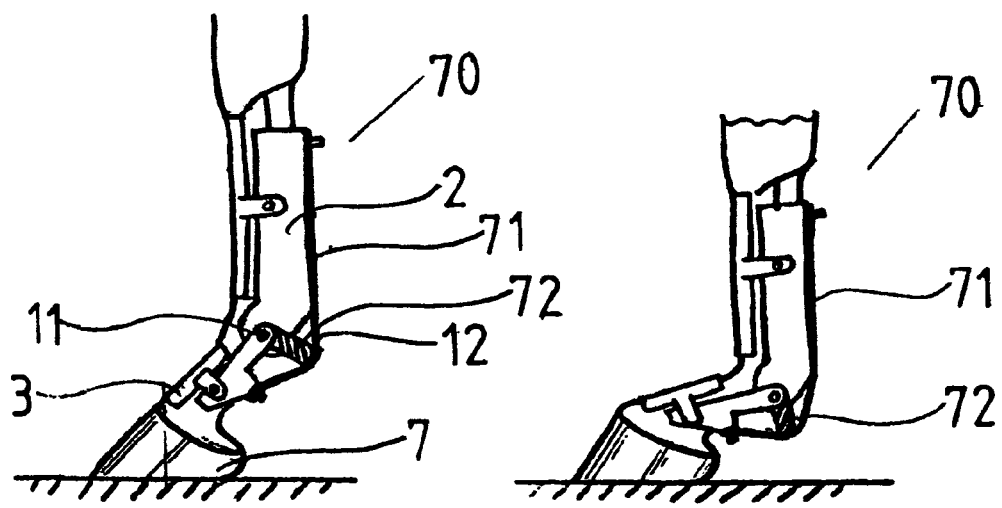
Figures 17, 18:
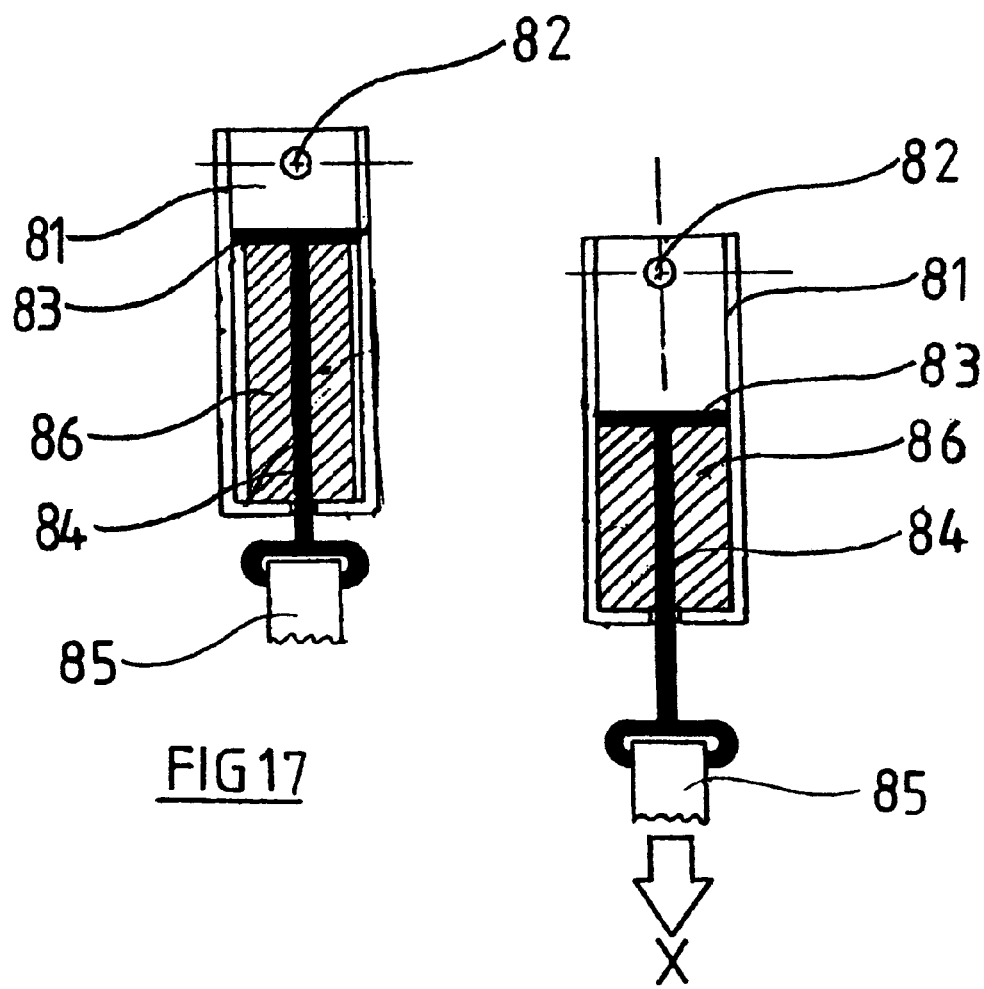
Figure 19:
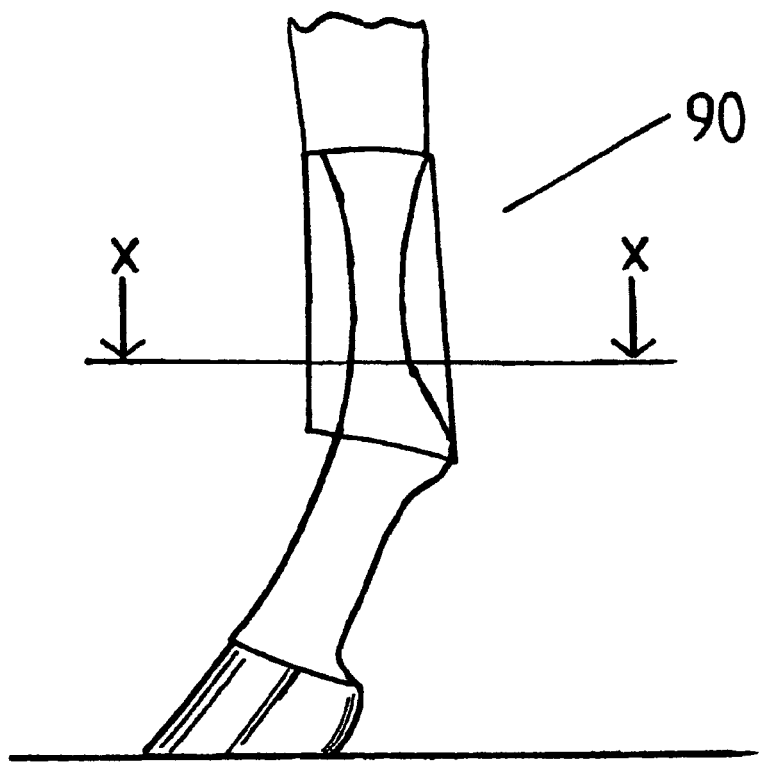
Figure 20:
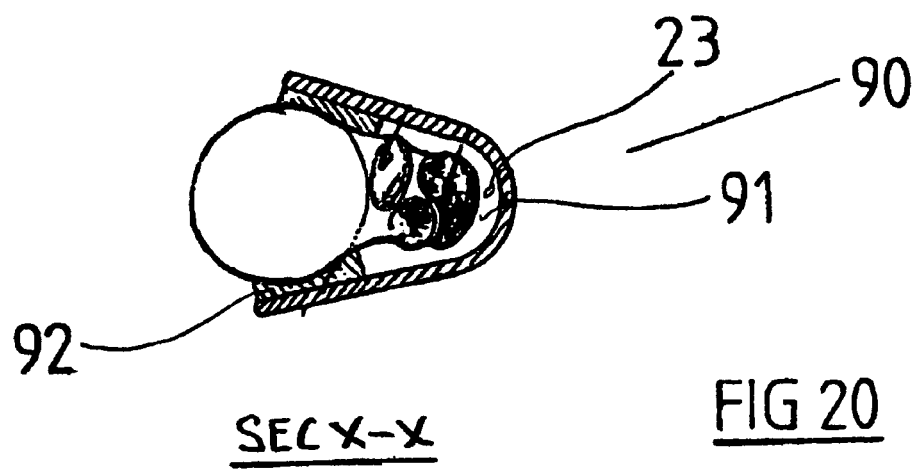
Figure 21:
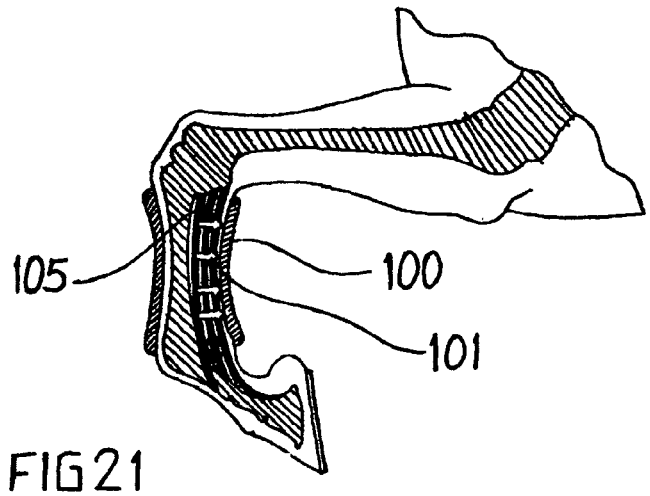
Figure 22:
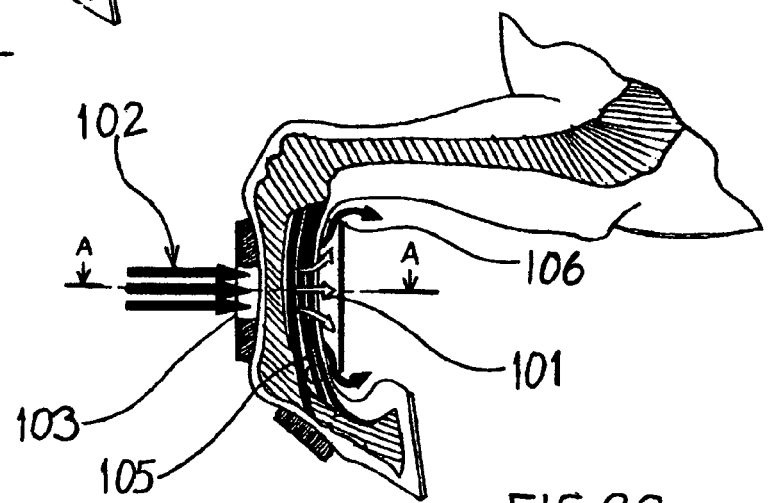
Figure 23:
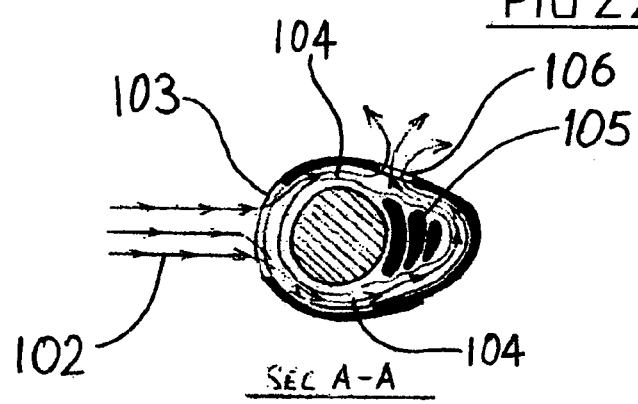
Figure 28:
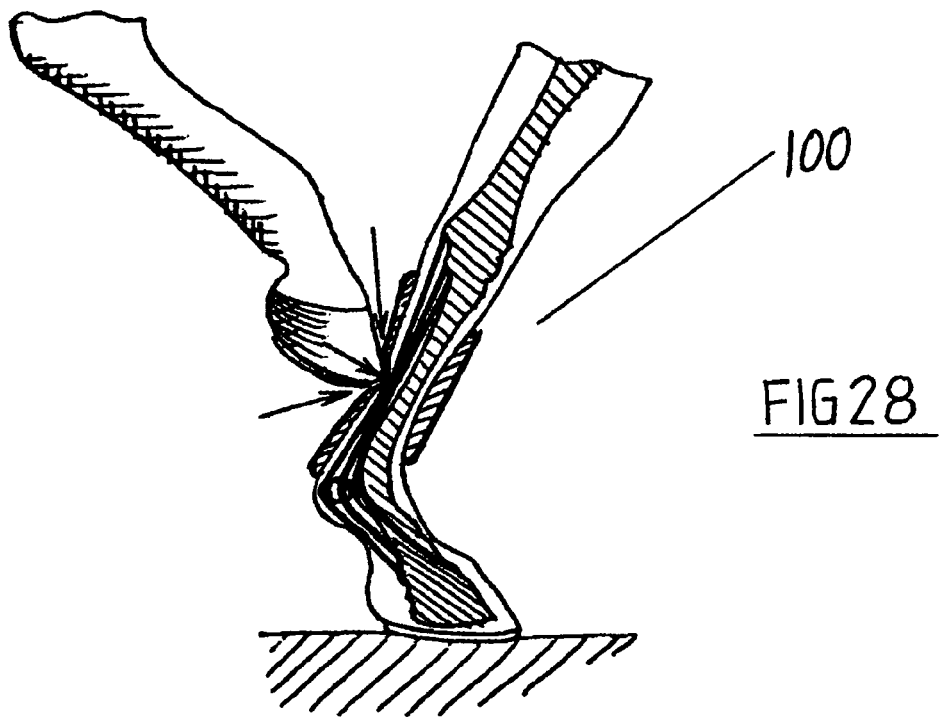
Figure 29:
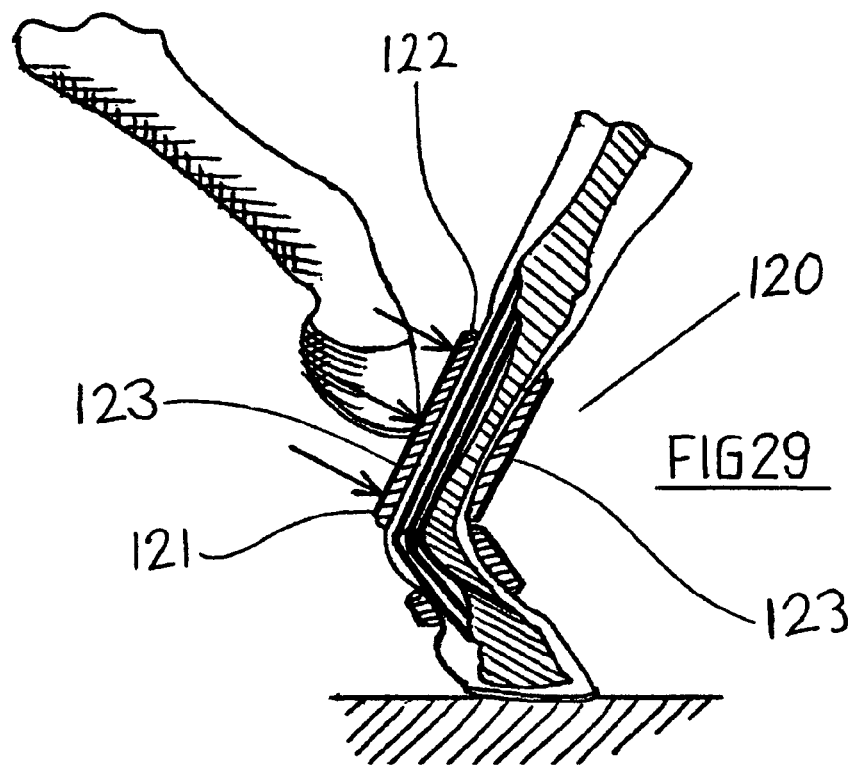

FIG. 12 a rear view of the tendon and ligament support of FIG. 11;

FIG. 13 is a side view of another tendon and ligament support according to the invention:

FIG. 14 is a side view of the tendon and ligament support of FIG. 13 in the loaded position;

FIG. 15 is a part sectional view of an artificial tendon according to the invention;

FIG. 16 is a side view similar to FIG. 15 of the artificial tendon in the loaded position;

FIG. 17 is a side sectional view of a still further artificial tendon according to the invention;

FIG. 18 is a side view of the artificial tendon of FIG. 17 in the loaded position;

FIG. 19 is a side view of a still further tendon and ligament support according to the invention FIG. 20 is a cross-sectional view along the line X-X of FIG. 19;

FIG. 21 is a cross-sectional side view of a tendon and ligament support on a horse's leg;

FIG. 22 is a cross-sectional side view of the tendon and ligament support on a horse's leg;

FIG. 23 is a cross-sectional plan view along the line A-A of FIG. 22;

FIG. 24 is a perspective view of still a further tendon and ligament support according to the invention;

FIG. 25 is a further perspective view of the tendon and ligament support of FIG. 24;

FIG. 26 is a still further perspective view of the tendon and ligament support of FIG. 24;

FIG. 27 is a part development view of the tendon and ligament support of FIG. 24;

FIG. 28 is a cross-sectional side view of a tendon and ligament support on a horse's leg; and FIG. 29 is a cross-sectional side view of the tendon and ligament support;

Referring to the drawings and initially to FIGS. 1 to 4 thereof, there is provided a fetlock support for a horse's leg indicated generally by the reference numeral 1 having a canon bone-embracing collar 2 and a pastern bone-embracing collar 3 connected by a connecting piece 4 formed from a non-rigid, essentially inelastic or stiff material of high tensile strength, which allows limited elongation under load. The connecting piece 4 which runs along the palmar aspect of the metacarpus and digit, effectively exerts a resistance to rotating about a pivot point 5 over a predetermined range of fetlock joint rotation. Interposed between the horse's leg and the canon bone-embracing collar 2 and the pastern bone-embracing collar 3 is a cushioning material 8. The cushioning material 8 may be of any natural or synthetic material such as a viscoelastic foamed plastic. This material has been found to be most effective at absorbing the impact of a strike from a hind leg.

The connection piece, which can be made from any suitable inelastic and high tensile material such as unidirectional Kevlar fibre, will allow limited elongation and effectively provide a resistance to fetlock joint rotation within the connection piece by its very nature. Thus there is an inelastic support of high tensile strength provided which will prevent excessive pivoting of the fetlock joint and hence excessive tensile stress on the tendons and ligaments. The fetlock joint point of rotation is identified by the reference numeral 5, as are the sesamoid bones by the reference numeral 6. The hoof is identified by the reference numeral 7.

Figure 1:
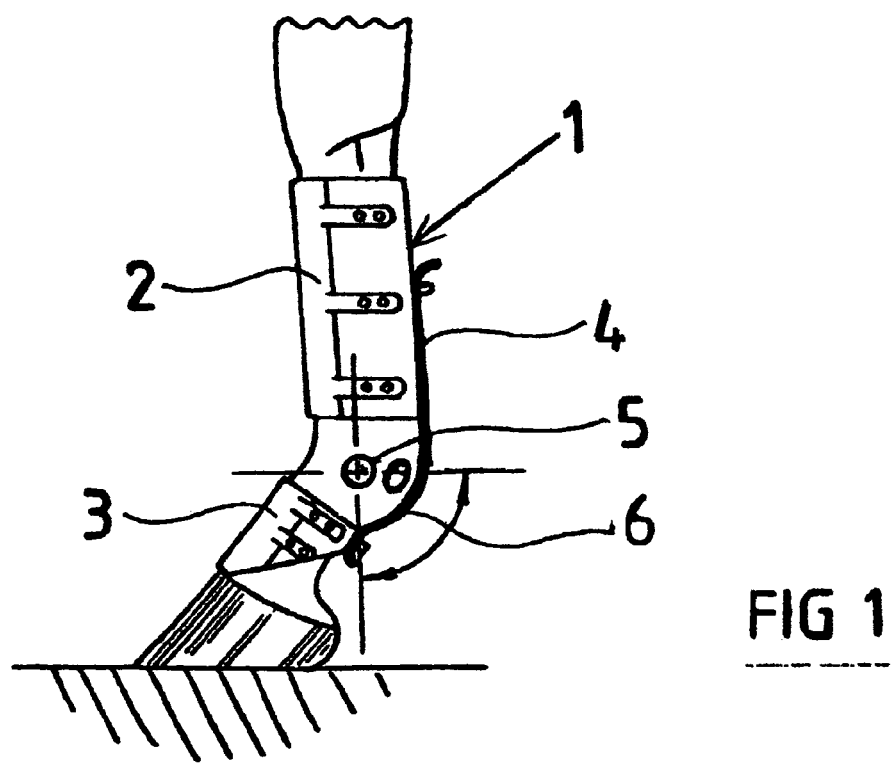
FIG. 1 is a side view of a tendon and ligament support according to the invention on a horse in standing position.
Figure 2:
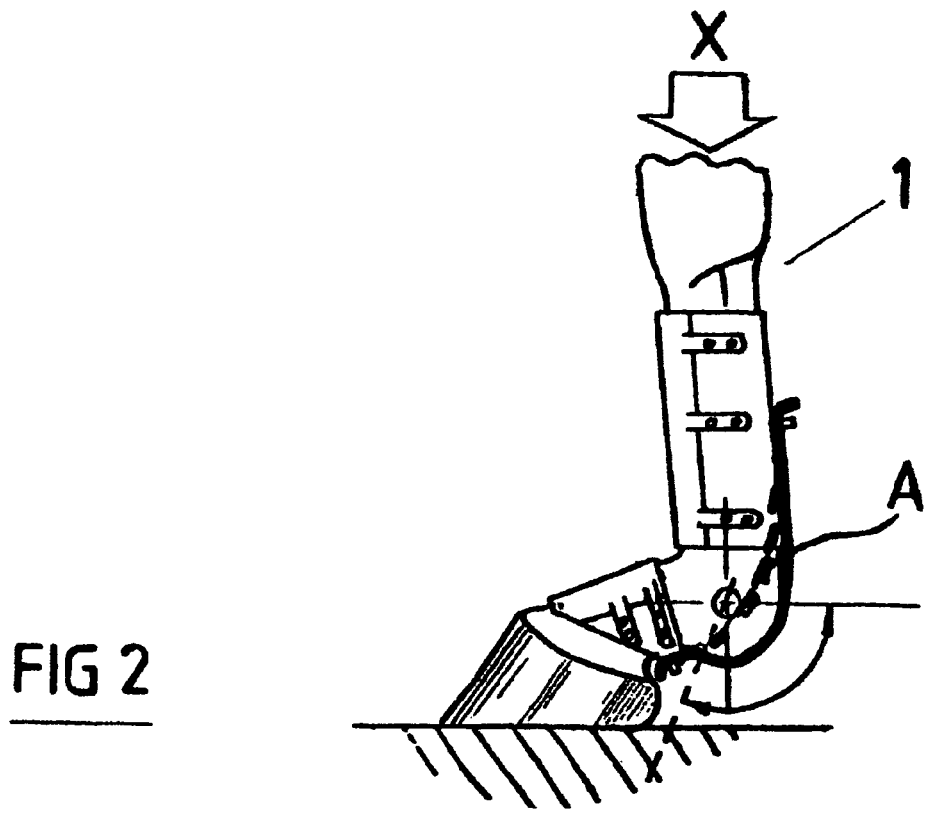
FIG. 2 is a side view of the tendon and ligament support of FIG. 1 representing the horse's fetlock joint under exercise load.
Figure 3:
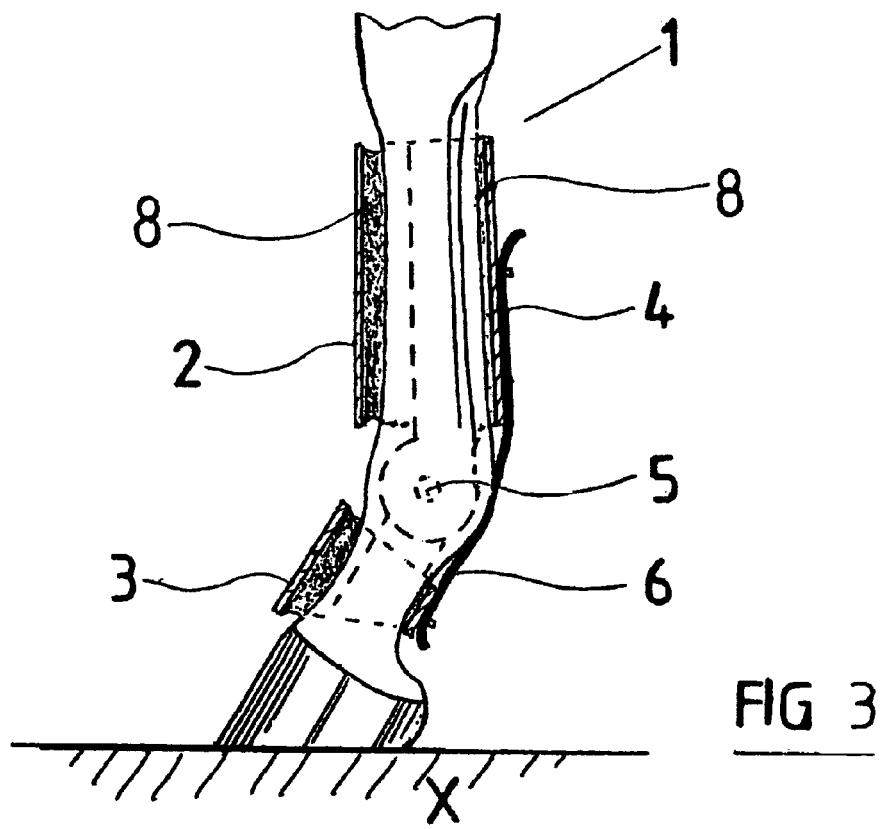
FIG. 3 is a typical vertical cross section through the tendon and fetlock support as illustrated in FIG. 1 on a horse in standing position.
Figure 4:
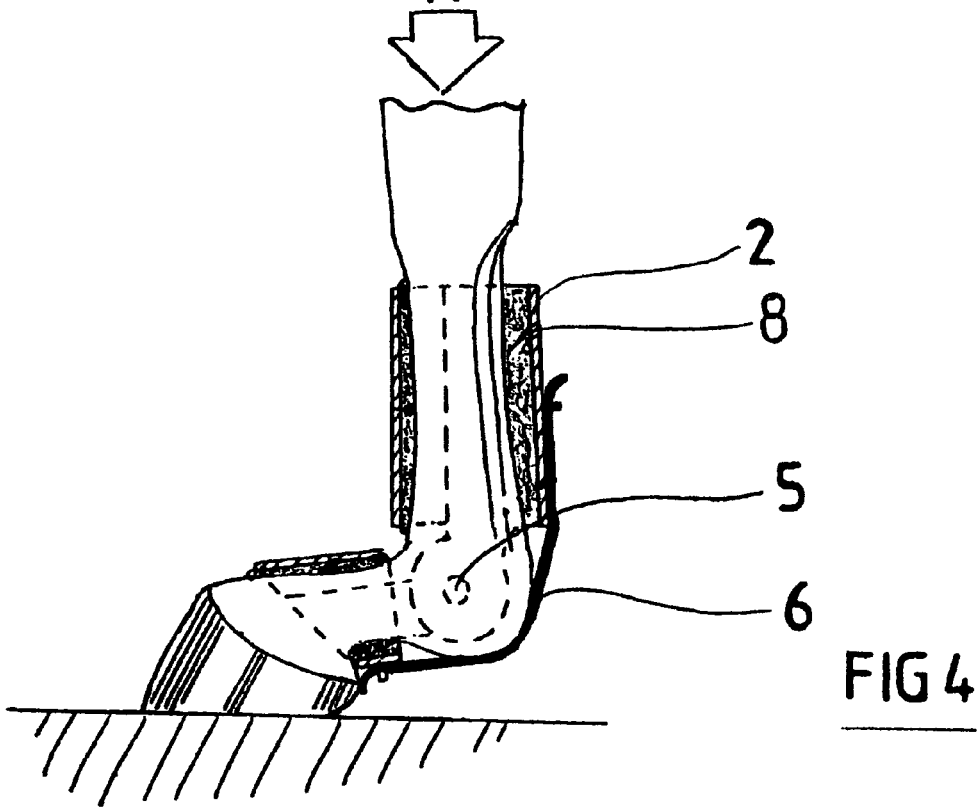
FIG. 4 is a typical vertical cross section through the fetlock support as illustrated in FIG. 2 representing the horse's fetlock joint under exercise load.

When the horse places weight on its leg, a compression load identified by the reference letter X in FIGS. 2 and 4 is exerted on the canon bone. As it does so the cannon bone moves downwards towards the ground and this in turn causes the fetlock joint 5 to rotate. The connecting piece 4 resists this said rotation as it must now stretch under tensile load. Since the connection piece is inelastic, of a high tensile strength, and is securely anchored between the canon bone embracing collar 2 and the pastern bone-embracing collar 3, it will resist rotation of the fetlock joint 5. Since this rotation of the fetlock joint is the cause of tensile stress on the flexor tendons and ligaments of the horse, any reduction of this said rotation by artificial means will artificially reduce the said stress on the tendons.

Figure 5:
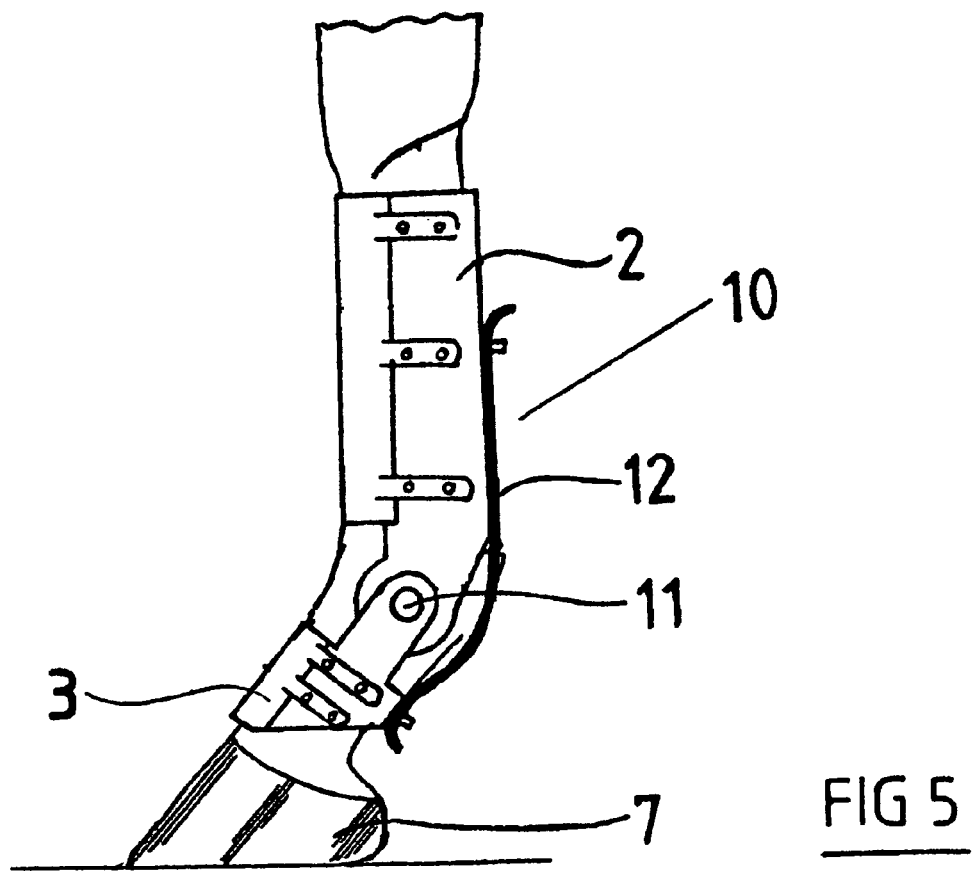
FIG. 5 is a side view of an alternative construction of the tendon and ligament support.

Referring to FIG. 5, there is illustrated an alternative construction of tendon and ligament support indicated generally by the reference numeral 10 in which parts similar to those described with reference to the previous drawings are identified by the same reference numerals. In this embodiment the connecting piece comprises a compression hinge 11 between the canon bone-embracing collar 2 and the pastern bone-embracing collar 3. An artificial tensile tendon 12 is mounted between the canon bone-embracing collar 2 and the pastern bone-embracing collar 3 behind the fetlock joint 5. This tensile tendon 12 is an inelastic connection piece and will provide support for the tendons and ligaments by exerting a resistance to the pivoting of the canon bone collar 2 about the pastern bone-embracing collar 3 in the same manner as described above. The purpose of this hinge 11, which rotates concentrically with the pivot point of the fetlock joint 5, is to keep separate the two collars as they are inclined to be pulled together by the artificial tensile tendon, under high load.

Figure 6:
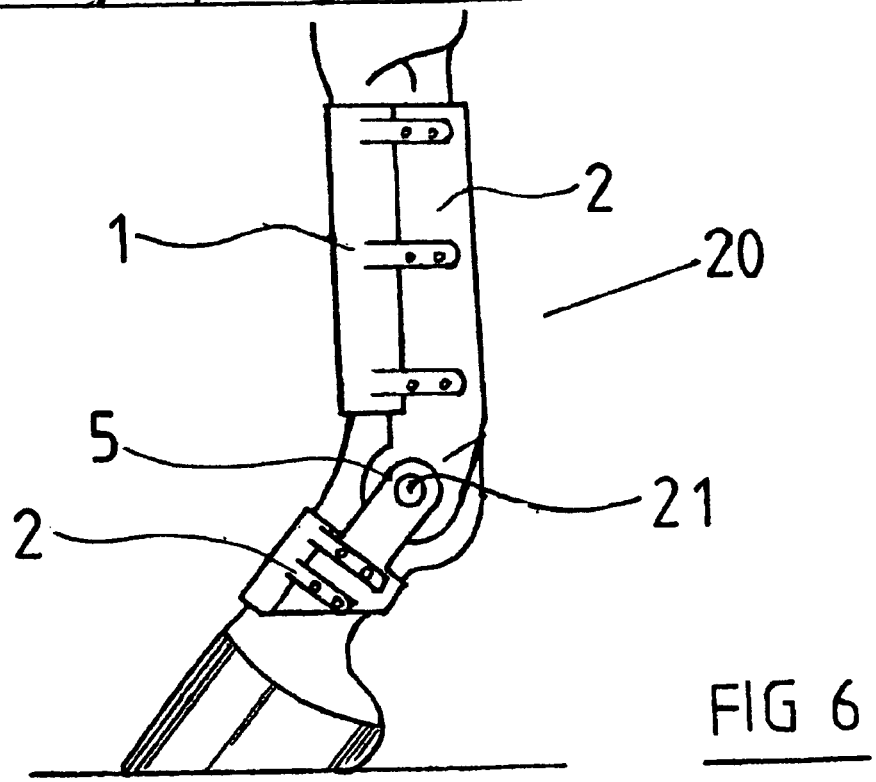
FIG. 6 illustrates a still further construction of the tendon and ligament support.

Referring now to FIG. 6 there is illustrated a still further construction of tendon and ligament support indicated generally by the reference numeral 20 which is substantially similar to the tendon and ligament support 10 illustrated in FIG. 5 and parts similar to those described with reference to the previous drawings are identified by the same reference numerals. In this embodiment there is provided a compression hinge 21 which, unlike the hinge of FIG. 5, resists rotation by means of friction within the bearing surfaces of the hinge itself. The hinge can be of any suitable construction. It is envisaged that the hinge may be resistant to rotation in one or both directions.

Figure 7:
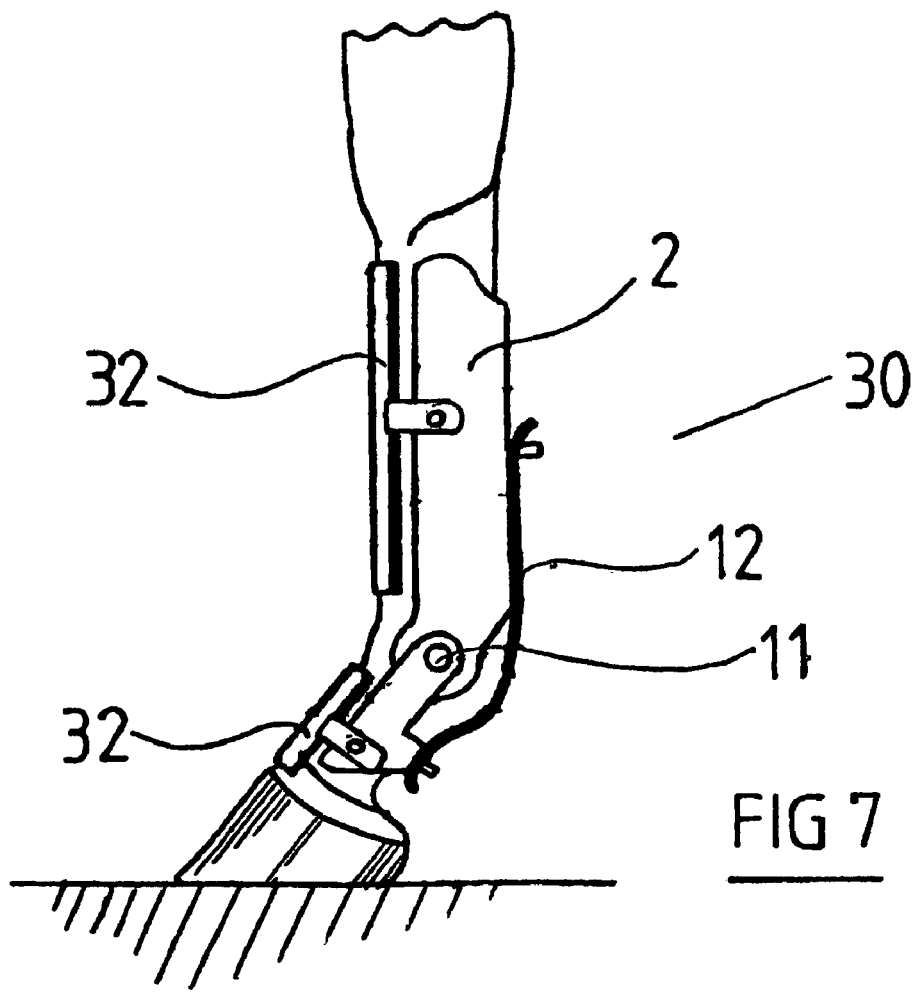
FIG. 7 is a side view of a still further construction of the tendon and ligament support according to the invention.
Figure 8:
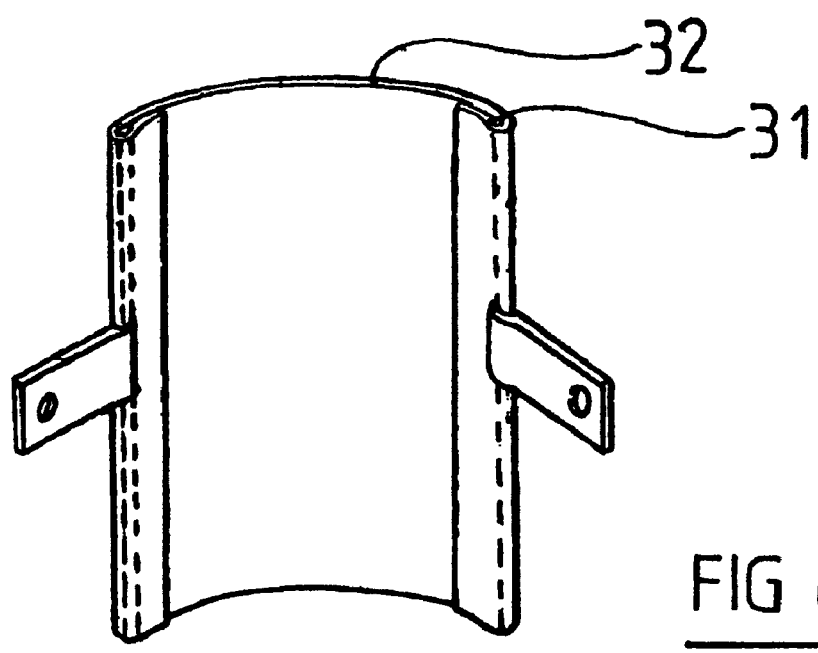
FIG. 8 is a perspective view of portion of the tendon and ligament support of FIG. 7.

Referring now to FIGS. 7 and 8, there is illustrated a still further construction of tendon and ligament support indicated generally by the reference numeral 30 in which parts similar to those described with reference to FIG. 5 are identified by the same reference numerals. In this embodiment, each of the bone-embracing collars 2 and 3 incorporate a pair of rigid bars 31 in a pad 32 as can be seen clearly in FIG. 8. The bars 31 will help to distribute the load across both the canon bone-embracing collar 2 and the pastern bone-embracing collar 3.

Figure 9:
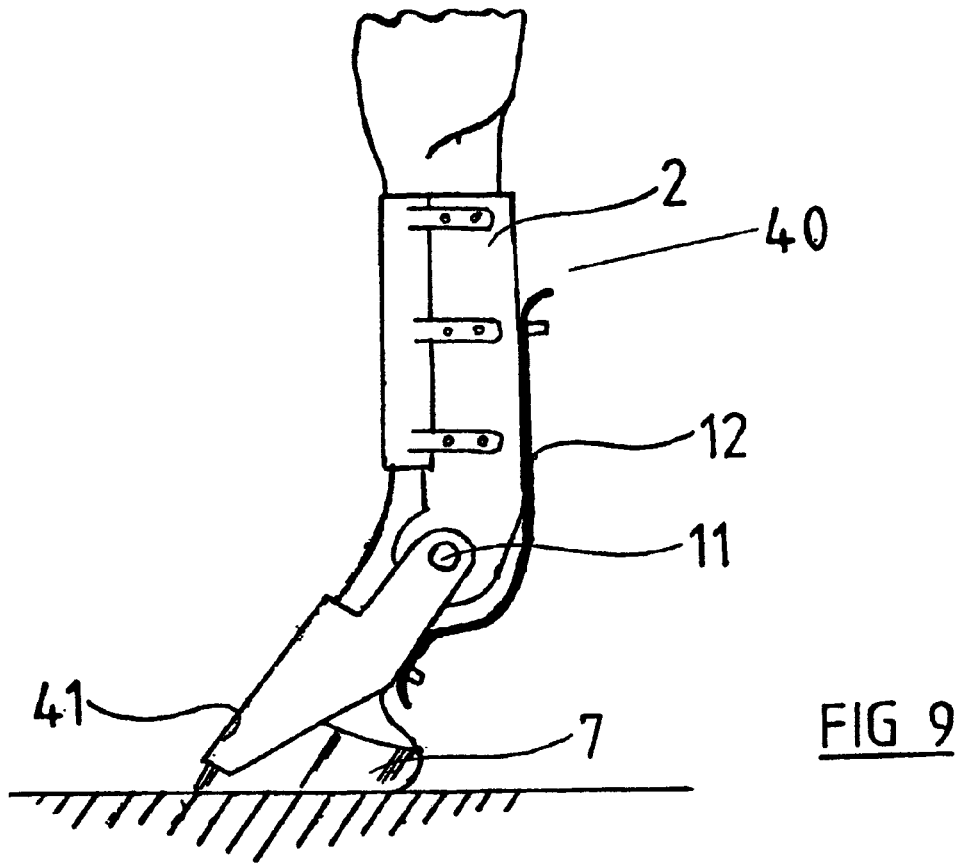
FIG. 9 is a side view of another tendon and ligament support according to the invention.

Referring now to FIG. 9, there is illustrated a still further construction of tendon and ligament support indicated generally by the reference numeral 40 in which parts similar to those described with reference to FIG. 5 are identified by the same reference numerals. In this embodiment there is provided a pastern bone-embracing collar 41 which extends over the hoof 7 providing further support.

Figure 10:
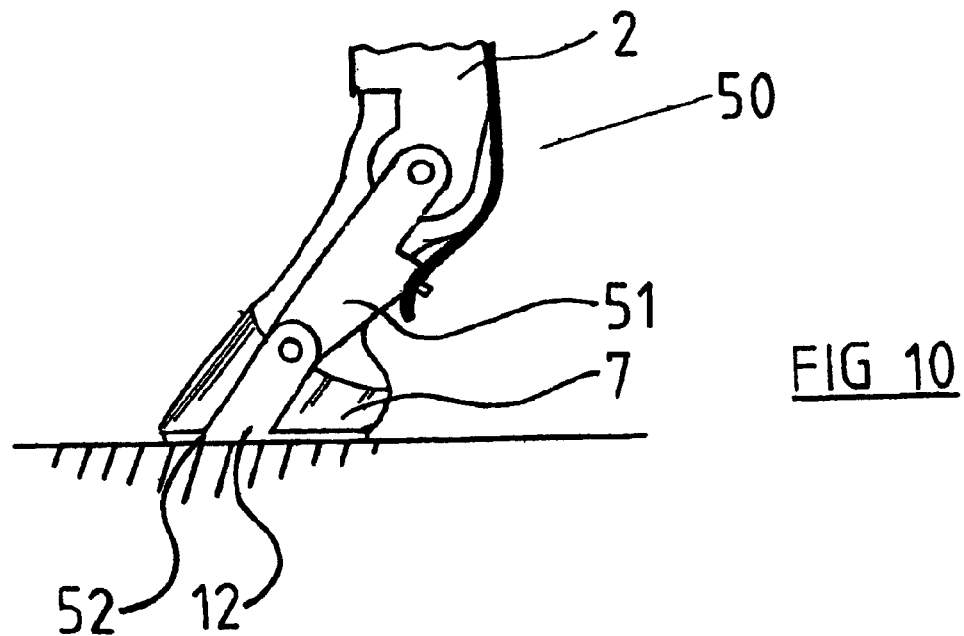
FIG. 10 is a side view of a still further tendon and ligament support according to the invention.

In FIG. 10 there is illustrated an alternative construction of tendon and ligament support 50 which is substantially identical to the tendon and ligament support illustrated in FIG. 9, except that there is provided a pastern bone-embracing collar 51 securely connected to a hoof shoe support 52 fitted beneath the hoof 7.

Referring now to FIGS. 11 and 12, there is illustrated an alternative construction of tendon and ligament support indicated generally by the reference numeral 60. In this embodiment which is substantially similar to the embodiment illustrated in FIG. 5, and in which parts similar to those described with reference to FIG. 5 are identified by the same reference numerals, there is provided an artificial tensile tendon 61 which extends around the leg to brace the sesamoid bones behind the fetlock. The advantage of this is that any weight that might be transmitted to the sesamoid bones is now transmitted over a wider area for reduced pressure on the sesamoid bones. Because of the manner in which the artificial tendon 61 is constructed, the hinge 11 cannot be clearly seen. The artificial tendon 61 effectively cups the back of the joint as it extends, as shown in FIG. 11, and prevents any tendency for upward slide of the collar 2.

Referring now to FIGS. 13 and 14, there is illustrated a still further construction of tendon and ligament support indicated generally by the reference numeral 70; again parts similar to those described with reference to FIG. 5 are identified by the same reference numerals. In this embodiment, there is an artificial tensile tendon 71 connected by a connector piece 72 to the hinge 11. It can be seen from FIG. 12 how the connector piece 72 protects and bears the pressure that would normally be transmitted to the sesamoid bones.

Referring now to FIGS. 15 and 16, there is provided an alternative construction of artificial tendon, indicated generally by the reference numeral 72 which comprises a compressible member 73 mounted against a support 74 on the canon bone-embracing collar 2, only portion of which is shown. A member engaging means 75 is provided and is connected by a rod 76 and strap 77 to the pastern bone-embracing collar, which is not illustrated. The compressible member 73 can be formed from any suitable compressible material such as rubber. It will be seen from FIG. 14 how the compressible member 73 is compressed under load.

Referring now to FIGS. 17 and 18, there is illustrated an alternative construction of artificial tendon indicated generally by the reference numeral 80, which comprises a cylinder 81 having a mounting hole 82 for connection to one of the canon or pastern bone embracing collars which houses a piston 83 connected by a rod 84 to a strap 85 which can be connected to the other bone-embracing collar. Housed within the cylinder 81 by the piston 83 is a compression resistant material 86. This material could be any liquid, gas or a solid material such as a foamed plastics material or rubber. FIG. 18 illustrates how this works under a load X. The important aspect of this latter embodiment is that there is a high level of controllability. By means of altering the volumetric ratio between the compressible material and the actual container or cylinder it is possible to alter clearly the response of the artificial tendon, and thus to tailor the particular construction of artificial tendon to a specific strain curve and thus to an animal's need.

Referring now to FIGS. 19 and 20, there is illustrated a canon bone-embracing collar indicated generally by the reference numeral 90 incorporating an elongate open-ended cooling channel 91. The advantage of the cooling channel 91 is that it will allow water and air to pass therebetween preventing irritation and other diseases or damage to the horse's legs. These can occur if the temperature of the leg gets too high and also if any pressure is placed on the tendon surface as the horse exercises.

Referring specifically to FIGS. 21 to 23, FIG. 21 illustrates the heat-insulating problem associated with conventional equine leg protection devices 100. The heat, represented by white arrows, radiates from the tendon core 101 outward to the leg surface where it is blocked from further dissipation by the insulating effect of the conventional boot or bandage. Heat within the tendon core will then accumulate. Consequently the risk of heat injury to the tendons and ligaments is increased by the use of such heat insulating boots and bandages. FIGS. 22 and 23 illustrate an advantage of the invention in its ability to aid cooling of the flexor tendons and suspensory ligament during exercise. The device which utilises the high-speed, cold air 102 hitting the front of the horses leg, as it gallops, to pass through air intakes 103 at the front of the device. From there the high-speed, cold air is compressed and channelled via air channels 104 to the tendons and ligaments 105. This air then acts as a coolant for the horse's tendons and ligaments 105. The circulation of cold air through the structure is enabled by air exit holes 106.

Referring now specifically to FIGS. 24 to 27, there is illustrated a tendon and ligament support indicated generally by the reference numeral 111, having a canon bone embracing collar 112 and a pastern bone embracing collar 113 connecting together by a compression hinge 114 and a tensile artificial tendon 115. Both collars 112 and 113 are hinged centrally at the back and closed centrally at the front. This enables unitary construction whereby each of the collars requires only two parts. It also enables an easy method of applying the device to the horse's leg. FIG. 27 illustrates the artificial tensile tendon 115 in another embodiment where it comprises a central ring 116 embracing the sesamoid bones. Anchored around the central ring 116 is an array of straps 117, of adjustable tension and length and made from flexible material of high tensile strength such as unidirectional Kevlar fibres. These straps 117 are in turn anchored securely to the canon bone embracing collar and the pastern bone-embracing collar. The device resists fetlock joint rotation by means of the inherent compression strength of the carbon fibre joint 114 combined with the tensile strength of the Kevlar tensile artificial tendon 115. The amount of resistance that the system provides to fetlock joint rotation is a function of the position of an adjuster 118, with a range of settings. The different settings change the length of the tensile artificial tendon 115. At the lowest setting, the support element is at its longest and hence slackest length, offering the least amount of support; while at the highest setting the tensile artificial tendon 115 is shortest, offering the greatest degree of support to the fetlock joint.

Referring now specifically to FIGS. 28 and 29, FIG. 28 illustrates the over-reach striking problem associated with conventional equine leg protection devices 100. These devices 100 typically have an outer shell made from relatively soft materials such as leather, plastic or woven fabrics. These softer materials cannot resist the strike impact of the most severe over-reach by a hind leg. Consequently the material deforms on impact and the horse commonly gets a traumatic injury. FIG. 29 illustrates a tendon and ligament support comprising a canon bone-embracing collar 121. This illustrates the benefits of the invention in the event of an accidental strike from a hind leg. Here a composite panel 123 externally covers the vulnerable anatomy. As can be seen the force of the impact is distributed over the entire length of the device and is immediately deflected away from the horse's tendons and suspensory ligament. The shock absorbent foam 122 underneath further increases this protective effect. This foam can for example be of a viscoelastic type foam with excellent shock-absorbing properties. The combination of the inherent stiffness of the composite panel 123, such as but not limited to carbon fibre, and the curved outer shape into which it is moulded ensure that it will not deform in shape during the severest of impacts that can occur during equestrian activities. Also the composite panels are designed in such a way as to take advantage of the combined properties of hard resin carbon fibre. These include hardness, stiffness and low friction. These characteristics combined in turn with a curved outer shape panels with a low friction, hard surface, will aid to immediately deflect the force of the impacting object away from the fragile anatomy concerned.

The tendon and ligament support according to the present invention will be used for many different purposes. For example, when racing horses it is important that if the tendon and ligament support is used, it does not in any way interfere with or enhance whatsoever the normal movement of the horse. However, if the tendon and ligament support is arranged not to exert any resistance to rotating until the fetlock joint rotates beyond a point where damage could occur to the horse such as, for example, when a horse is over tired or unfit, then this will not be performance-enhancing as the horse will no longer be able to race effectively but would simply prevent injury. A similar situation may occur during training. Further, when a trainer is attempting to build up a horse's strength after a long lay off whether due to injury or some other reason then providing some support to the tendon and ligament joints by having a progressively increasing resistance to pivoting may be advantageous. Further, when a horse has been injured it may be necessary to provide almost complete immobility of a fetlock joint to ensure that the tendons and ligaments are not damaged should they be sound or if they are damaged, to give them sufficient time and opportunity under rest conditions to recover.

Many materials may be used in the construction of the present invention. For example composite materials are often advantageous in situations such as this. A carbon fibre material would be particularly advantageous for the manufacture of the various parts of the invention. This material can be used to give a very high level of structural stiffness and at the same time is relatively light-weight. Obviously in situations where lightness of weight is not crucial, for example when the invention is used for the treatment of injury, less expensive materials such as aluminium or steel, while heavier, may be used as they will still provide the relative degree of structural stiffness. As explained above, viscoelastic foamed plastics, glass fibre and Kevlar materials are also advantageously used.

It is envisaged that any suitable materials may be used to manufacture the support of the invention. It is further envisaged that the hinges may provide some lateral play.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described which may be varied in both construction and detail.

The invention claimed is:

1. A tendon and ligament support for a horse's fetlock joint having an anterior side and a posterior side comprising
   a cannon bone-embracing collar,
   a pastern bone-embracing collar,
   means for securing the collars so as to embrace the horse's leg respectively above and below the fetlock joint,
   connection means for providing articulation and separation between the two collars, wherein the connection means is adapted to provide limited ligament and/or tendon elongation under load, and the connection means comprising, in combination,
   a pivot, arrangement for providing articulation and separation between the two collars and
   an essentially inelastic connector of high tensile strength connected to one or more points on each of said cannon bone-embracing collar and said pastern-bone-embracing collar arranged across the posterior side and centrally of the fetlock joint so as to limit fetlock joint movement within a predetermined range of pivot rotation.

2. A tendon and ligament support as claimed in claim 1, in which at least one of said collars further comprises a panel constructed from shock-absorbent composite materials adapted to provide protection to a horse's fore leg against over reach striking by the horse's hind leg.

3. A tendon and ligament support as claimed in claim 1, wherein the pivot arrangement is arranged to exert a substantially constant resistance to joint movement as the pivot arrangement rotates under downward pressure.

4. A tendon and ligament support as claimed in claim 1, wherein the pivot arrangement is arranged to exert no resistance to joint movement unless the pivot arrangement rotates beyond said predetermined range of pivot rotation.

5. A tendon and ligament support as claimed in claim 1, wherein the pivot arrangement is arranged to be locked in position so as to exert total resistance to joint movement in both flexion and extension when so required.

6. A tendon and ligament support as claimed in claim 1, wherein the pivot arrangement is arranged to exert progressively increasing resistance to joint movement as the pivot arrangement rotates under downward pressure.

7. A tendon and ligament support as claimed in claim 1, wherein the connection means includes adjustment means adapted to vary said predetermined range of pivot rotation.

8. A tendon and ligament support as claimed in claim 1, in which the pivot arrangement is adapted to accommodate limited lateral joint movement.

9. A tendon and ligament support as claimed in claim 1, in which the pivot arrangement includes one or more hinges.

10. A tendon and ligament support as claimed in claim 1, in which either said cannon bone-embracing collar or said pastern bone-embracing collar comprises air intake entrances facing to the front of the support, and comprises channels on the inside of the support arranged to allow air to pass from the intake entrances over and adjacent to the horse's leg from one part of the support to another, during forward motion of the horse.

* * * * *